H. A. CHURCH.
Ornamental Chain.

No. 230,745. Patented Aug. 3, 1880.

WITNESSES:
Joseph A. Miller Jr
Chas. G. Calder

INVENTOR:
Henry A. Church
by Joseph A. Miller
Atty.

UNITED STATES PATENT OFFICE.

HENRY A. CHURCH, OF PROVIDENCE, RHODE ISLAND.

ORNAMENTAL CHAIN.

SPECIFICATION forming part of Letters Patent No. 230,745, dated August 3, 1880.

Application filed December 10, 1879.

*To all whom it may concern:*

Be it known that I, HENRY A. CHURCH, of the city and county of Providence, and State of Rhode Island, have invented a new and useful Improvement in Ornamental Chains; and I hereby declare that the following is a full, clear, and exact description of the same, reference being had to the accompanying drawings, forming part of this specification.

This invention has reference to improvements in ornamental chains in which a large number of links or rings are united together to form a band of any desired width or length.

The object of this invention is to produce a cheaper and better chain, which can be readily repaired.

The invention consists in the improved manner of securing the rings or units together, as will be more fully set forth hereinafter.

Figure 1:
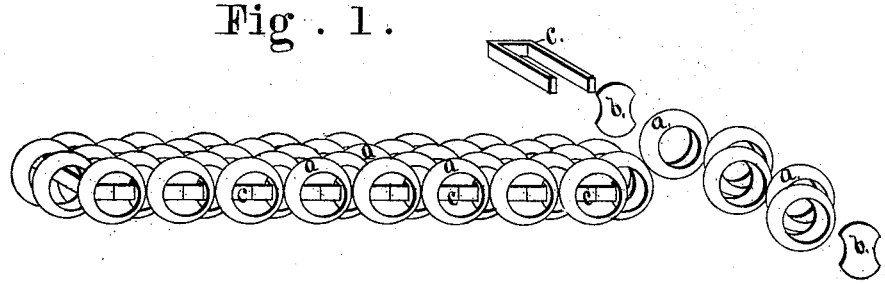
Figure 2:
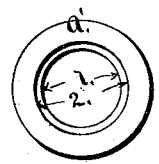
Figure 2:
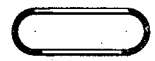
Figure 3:
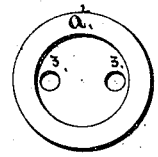
Figure 3:
Figure 4:
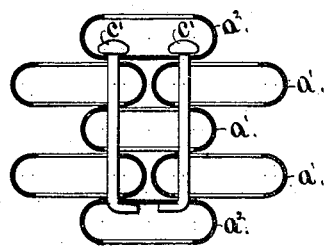

Figure 1 is a perspective view of one of my improved chains, shown in the process of its manufacture, with the units, the washer, and staple ready to unite another row to the rest of the chain. Fig. 2 is a view and section of one of the rings or units, showing that one of the openings is of sufficiently less diameter than the other to allow of the insertion and retention of a washer. Fig. 3 is a view of a unit or ring, one side of which is closed, and provided with two holes to receive the staple. Fig. 4 shows the chain connected by means of two pins, each passing through two sets of rings.

To enable others skilled in the art to manufacture my improved ornamental chain, I will now describe the same more fully.

In the drawings, $a\ a$ are the rings or units of which the chain is composed. These units are shown as round rings; but they may be made of oblong, oval, or other form.

$a'$, Fig. 2, is a ring in which the opening 1 is of less diameter than the opposite opening, 2, for the purpose of inserting and retaining a washer. The rings or units may have both openings of uniform diameter, and the sides of the chain may be formed of units like $a'$, so as to insert a washer and bind the whole together by means of a staple; or all the units may be made like $a'$, and I prefer to make them all alike, as the chain becomes more flexible when only one edge of the rings or units bears on the connecting wire or staple.

$a^2$, Fig. 3, is a ring or unit one side of which is closed, and is provided with the holes 3 3, through which the staple is passed.

The whole chain may be made of units like $a^2$, or only the end units of each row, thus forming the side or edge of the chain.

$b\ b$ are two washers, which are inserted into the end units of each row.

$c$ is the staple, one leg of which passes through the row already secured to the chain, and the other through the row to be connected, the closed end of the staple resting against the washer on one end of the row, and the ends of the staple are bent over the washer in the opposite end of the row.

Row after row of rings or units are thus connected by the staple, and a strong flexible chain is produced, which can be easily and quickly repaired by inserting a new staple.

When the chains as heretofore constructed by weaving break a large portion of the chain is liable to be lost, as the light binding-wire will allow the rings to fall from the same, and when the breakage is discovered the greater part of the chain may be scattered over so large a space or territory that the recovery is impossible and the chain cannot be repaired.

My improved chain is not liable to such an accident, for should one of the staples break the chain would separate without the loss of more than one row of rings or units, and usually without even much loss.

My improved ornamental chain is not only stronger and more flexible than such chains as heretofore made, but can be made at less cost. By a simple device the units and washers can be fed automatically, the staples inserted and clinched very rapidly. I prefer to make the whole chain of units like $a'$, in which one opening is slightly larger than the other, no matter how the units are secured together, as the chain is much more flexible. When both sides of the ring or unit rest on the binding-wire they are so firmly held by the four edges bracing each other that the chain is liable to be very rigid, whereas when only one side of the ring or unit bears on the wire more lateral flexibility is secured, and in chains made by weaving the units together the binding-wire is not so liable to break, and the chain becomes more durable.

The chain may also be made by passing the pins $c'$ $c'$ (shown in Fig. 4) through the end units, $a^2$ $a^2$, and the intermediate units, and then clinching the same, as shown, without departing from the spirit of my invention.

It will be noticed that the staples or pins are concealed or contained within the rings, and thus is avoided the projection on the edges of the chain of the fastening means.

Having thus described my invention, I claim as new and desire to secure by Letters Patent—

1. In an ornamental chain, the combination of a series of interlocking rows of rings or units with connecting devices concealed within such units and secured therein by their points being clinched, substantially as specified.

2. The combination, with the rings or units $a$, the end rings or units of each row being provided with a notched or perforated disk or washer, of suitable fastening devices, substantially as and for the purpose described.

3. As a new article of manufacture, an ornamental chain composed of a series of rows of rings or units secured together by suitable fastening devices, as described, the openings in the rings or units being smaller on one side than on the other, as and for the purpose set forth.

HENRY A. CHURCH.

Witnesses:
JOSEPH A. MILLER,
HENRY J. MILLER.